June 9, 1959 J. J. MARGANSKI ET AL 2,890,026
BAFFLE FOR ROLLS
Filed June 16, 1955 2 Sheets-Sheet 1
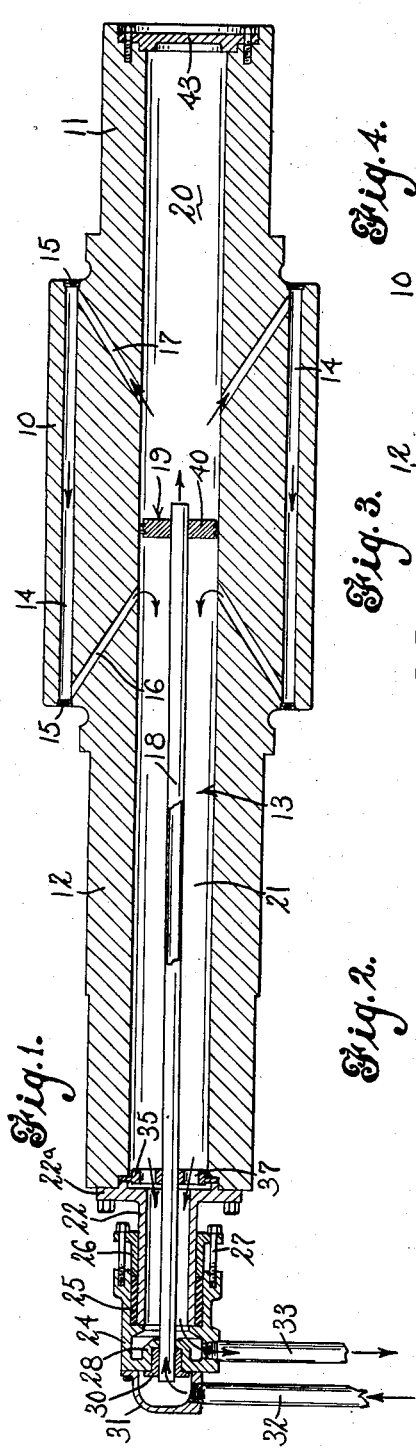
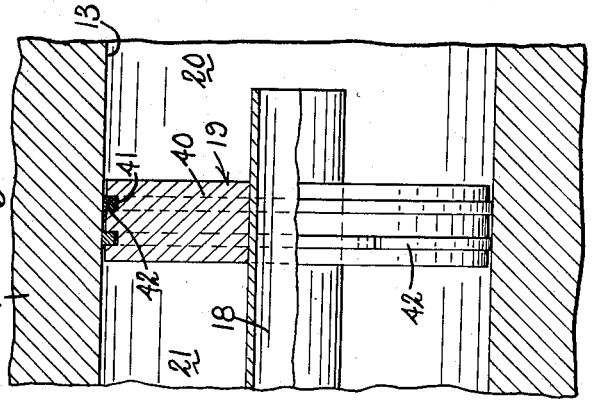
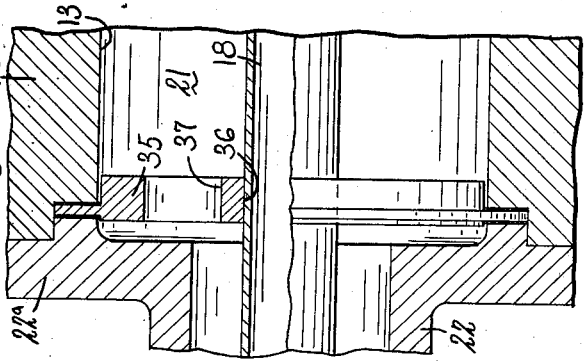
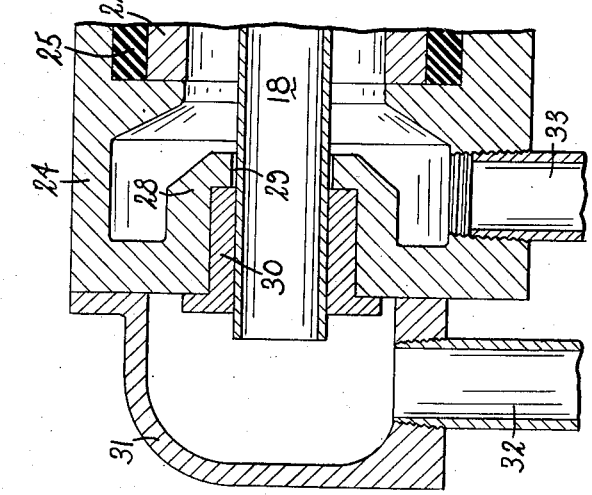
INVENTORS
Joseph J. Marganski
Arthur A. King Jr.
BY
Rockwell & Bucholow
ATTORNEYS

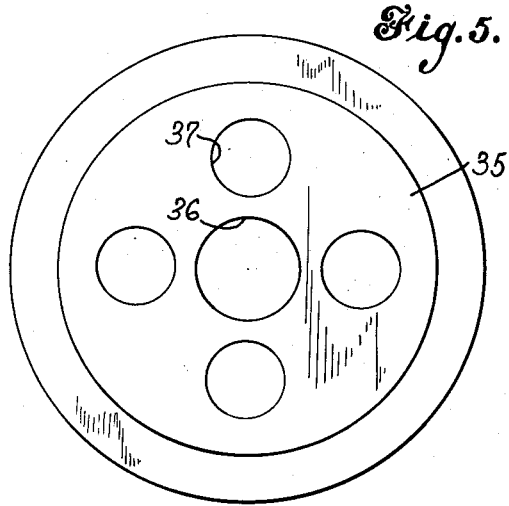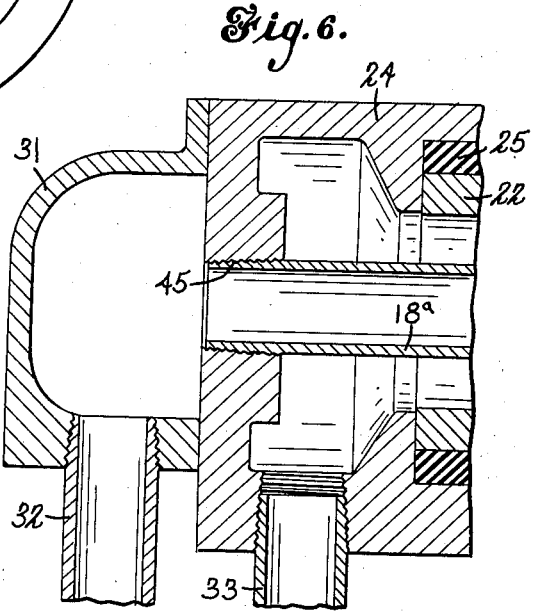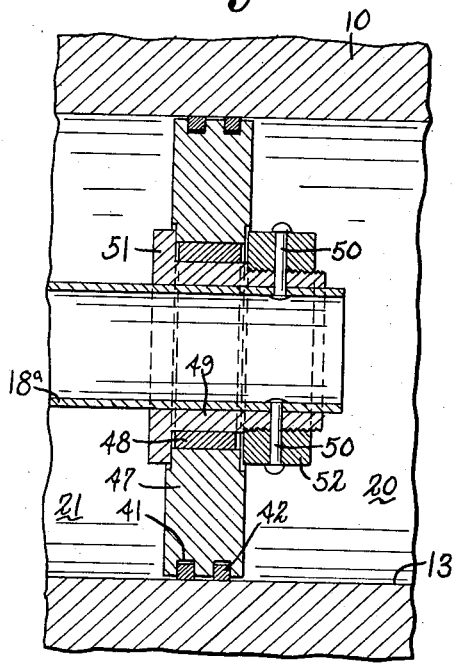

United States Patent Office 2,890,026
Patented June 9, 1959

2,890,026

BAFFLE FOR ROLLS

Joseph J. Marganski, Shelton, and Arthur A. King, Jr., Ansonia, Conn., assignors to Farrel-Birmingham Company, Incorporated, Ansonia, Conn., a corporation of Connecticut Application June 16, 1955, Serial No. 516,002

1 Claim. (Cl. 257—95)

This invention relates to baffles for rolls of calenders or like machines, and more particularly to a baffle employed in a roll, the temperature of which is controlled by the introduction of a heating or cooling fluid.

In machines such as calenders or similar machines used for sheeting rubber, plastics, linoleum or the like, it is desirable to control the temperature of the roll by the introduction into the roll of a heating or cooling fluid, usually water or steam. The roll is suitably drilled for this purpose, and the temperature-controlling fluid is introduced into the roll through a stuffing box, and after passing through drilled openings or passages in the roll, it passes out through an outlet opening, usually in the same stuffing box, at the end of the roll through which the fluid enters. Therefore, a baffle is required to separate the incoming and outgoing coolant fluid so that a circulation of this fluid is maintained during the operation of the device.

Usually these baffles are provided with packing material to make snug or tight contact with the wall of the opening in which the baffle is placed, the packing material being placed between brass rings or disks which are drawn together by bolts or rods so that the packing material will be held in tight contact with the wall of the opening. It has been found that with such construction the disks would tend to become loose after a period of use, and the packing material itself would be gradually worn off to the point where it would no longer function. It is the object of the present invention to provide a novel form of baffle which will make tight contact with the wear of the roll and which will at the same time be wear- and corrosion-resistant so that it will give a longer period of service than has been possible with the baffles previously employed.

One object of the invention is to provide a new and improved baffle construction for rolls of calenders, sheeting devices or the like which require the circulation therethrough of a heating or cooling medium.

A further object of the invention is to provide a novel form of baffle for rolls of calenders or the like wherein the baffle will turn with the roll in order to lessen the wear upon the baffle and at the same time will be wear and corrosion resistant so as to give a long period of service.

A still further object of the invention is to provide a baffle of the character described which baffle may be formed of suitable corrosion- and wear-resistant materials and will be provided with sealing rings to make tight contact between the baffle and the wall of the bore of the roll in which the baffle is placed.

To these and other ends the invention consists in the novel features and combinations of parts to be hereinafter described and claimed.

In the accompanying drawings:

Fig. 1 is a sectional view of a roll for a calender, sheeting device or the like, the roll being provided with passages for the circulation therethrough of a heating or cooling medium;

Fig. 2 is an enlarged sectional view of the stuffing box at the end of the roll through which the temperature-controlling fluid is introduced;

Fig. 3 is an enlarged sectional view of the end of the roll neck showing the manner in which the fluid-carrying pipe is supported;

Fig. 4 is a sectional view showing the construction of the baffle provided upon the pipe which carries the cooling or heating fluid;

Fig. 5 is an elevational view of the supporting member shown in Fig. 3;

Fig. 6 is a sectional view similar to Fig. 2, showing a modified form of our invention; and Fig. 7 is a sectional view similar to Fig. 4 showing the modified form of baffle used with the stuffing box construction shown in Fig. 6.

To illustrate a preferred embodiment of the invention, we have shown a roll of a calender or other sheeting device, the roll comprising a body or working portion 10 and reduced neck portions 11 and 12. The roll, as illustrated, is provided with a central bore 13 and in addition the working portion of the roll is provided with a plurality of bores or passages 14 extending therethrough and plugged or sealed at their ends as shown at 15. Diagonal or inclined passages 16 and 17 are provided in this portion of the roll to connect the passages 14 with the central bore 13.

The fluid which may be either a heating or cooling fluid is introduced into the roll through an internal pipe 18, and upon this pipe is mounted a baffle indicated generally by the numeral 19. This baffle divides the internal bore of the roll into two portions or chambers, one of them designated at 20 receiving the incoming fluid, while the other designated at 21 carries the outgoing fluid. It will be apparent that with this construction the incoming fluid enters the portion 20 of the internal bore and passes outwardly through the diagonal passages 17 at the right of the portion 10 of the roll, as shown in Fig. 1, into the longitudinal passages 14. It is then carried back to the internal bore of the roll through the inclined passages 16 upon the opposite side of the baffle 19, and thence passes outwardly from the roll as will be later explained.

A hollow flanged member 22 is secured upon the end of the roll through which the fluid enters and is discharged, and embracing this member is a stuffing box 24 having packing material 25 between its inner periphery and the outer periphery of the member 22, the packing material being compressed by the packing gland 26 adapted to be tightened by the bolts 27.

The stuffing box 24 is provided with a web 28 at its end having an opening 29 therethrough in which the pipe 18 is rotatably mounted, the pipe turning in a suitable bushing 30 carried by the web 28. This pipe leads from a jacket 31 secured to the stuffing box 24 and a supply pipe 32 leads to this jacket to convey the fluid to the interior thereof and thence to the pipe 18 for delivery to the portion 20 of the internal bore 13 of the roll.

A discharge pipe 33 is threaded into the side wall of the stuffing box 24 and communicates with the interior of the stuffing box, which in turn communicates with the interior of the hollow flanged member 22, the interior of this member in turn communicating with the internal bore in the roll.

A disk-like supporting member 35, shown more especially in Figs. 1, 3 and 5, is secured in the internal bore of the roll by being clamped between the end of the roll and the flange 22ª of the member 22. This pipe-clamping member is provided with an opening 36 through which the pipe 18 passes and also surrounding openings 37 through which the fluid may pass outwardly from the internal bore of the roll. It is understood that the pipe 18 is secured to the supporting member 35 which in turn is secured to the roll so that the pipe and baffle assembly will turn with the roll, the outer end of the pipe turning in the bushing 30. Thus there will be no wear between the baffle and the wall of the internal bore in the roll due to the relative rotation of the parts.

The baffle 19 shown in detail in Fig. 4 may be a metal disk 40 secured to the pipe 18, this disk being provided with annular grooves or channels 40 within which are mounted spring rings 42 of the usual type. Any suitable number of these rings will be provided, and it will be understood that the rings are split as is usual with piston rings.

The rings will tend to expand into tight contact with the wall of the internal bore of the roll and will, therefore, serve to separate the incoming fluid in the portion 20 of the roll bore from the outgoing fluid in the portion 21, thus insuring that the fluid pass outwardly through the passages 14 in its circulation through the roll.

At its inner end the pipe 18 will be properly supported by the baffle while at its outer end it is supported by the member 35 and also by the bushing 30 in the web 28 of the stuffing box 24 in which bushing it will turn freely as the roll is rotated. It is understood, however, that the pipe makes a fluid-tight fit in the bushing.

The end of the roll neck 11 may be closed by a closure member 43 of any desired form.

In Figs. 6 and 7 of the drawing we have shown a modification of our invention in which the baffle member rotates upon the pipe in the internal bore in the roll, and the outer end of this pipe instead of being rotatably mounted in the stuffing box is secured thereto so that the pipe remains fixed and does not rotate with the roll. So far as the elements of the device shown in Figs. 6 and 7 are the same as those previously described, the same reference characters are applied thereto.

As shown in Fig. 6 the pipe 18ª which corresponds to the pipe 18 previously described is threaded into the web 28 of the stuffing box 24, as shown at 45, so that the end of the pipe will be rigidly secured to the stuffing box, and it will be understood that in this form of the invention the support 35 may be omitted. Otherwise the parts adjacent the end of the roll at which the fluid enters and leaves are the same as those shown in Figs. 1 and 2.

The baffle construction at the inner end of the pipe 18ª is shown in Fig. 7. In this instance the baffle comprises a disk-like metallic member 47 provided with sealing rings 42 as before to make a tight seal with the wall of the internal bore 13 of the roll, the rings being provided in annular grooves or channels 41. The member 47 is, however, not fixed to the pipe 18ª but is rotatably mounted upon a bushing 48 which may be of carbon or other suitable material which will resist wear when subjected to steam or water, for example. The bushing 48 is carried upon a collar 49 secured to the pipe by pins 50, this collar being provided with a flange 51 at one end. A ring 52 is threaded upon the other end of the collar to hold the disk 49 in place between this ring and the flange 51, and the ring may also be secured to the pipe by the pins 50.

It will be seen that in this form of our invention the baffle member 47 is rotatably mounted upon the inner end of the pipe 18ª so that it will rotate with the roll in order that there be no friction between these parts and that the pipe 18ª is fixedly secured to the stuffing box 24 as shown at 45 so that the pipe remains stationary during the rotation of the roll.

It has been found that baffles consisting of a single metallic disk such as shown at 40 and 47 provided with split resilient sealing rings to make tight contact with the wall of the internal bore in the roll, will be effective in separating the incoming from the outgoing heating or cooling fluid and will give much longer service than baffles previously employed.

While we have shown and described some preferred embodiments of our invention, it will be understood that it is not to be limited to all of the details shown, but is capable of modification and variation within the spirit of the invention and within the scope of the claim.

What we claim is:

A roll for calenders or like devices having a central longitudinal bore extending through one end thereof and closed at the other end, and also having longitudinal passages adjacent its periphery and inclined passages leading from said central bore, some of which are connected to said peripheral passages at one end of the latter and others connected to the peripheral passages at the other end thereof, a stuffing box at one end of the roll, a fluid-carrying pipe supported at one end in said stuffing box and extending into the bore of the roll, a baffle member mounted on said pipe within the roll bore at a point between the inclined passages leading toward one of the ends of said peripheral passages and those leading toward the other ends thereof, said baffle member being supported upon the pipe to make snug contact with the wall of the bore preventing passage of the fluid past the baffle and being rotatable with the roll, and said baffle comprising a disk-like metallic member having annular channels in its peripheral edge and split resilient sealing rings mounted in said channel to seal the space between the baffle and the bore in the roll, and said stuffing box being provided with a space around said pipe to provide a fluid-carrying return passage.

References Cited in the file of this patent

UNITED STATES PATENTS

| | | |
|---|---|---|
| 1,477,120 | Hansen | Dec. 11, 1923 |
| 1,536,832 | Evans | May 5, 1925 |
| 1,754,826 | Hitchcock | Apr. 15, 1930 |
| 1,783,465 | Fox | Dec. 2, 1930 |
| 1,939,967 | Fox et al. | Dec. 19, 1933 |
| 2,015,747 | Drake | Oct. 1, 1935 |
| 2,712,924 | Nicolai | July 12, 1955 |

FOREIGN PATENTS

| | | |
|---|---|---|
| 21,001 | Great Britain | Sept. 17, 1913 |
| 469,551 | Germany | Dec. 14, 1928 |